United States Patent
Häring

(10) Patent No.: US 6,694,919 B2
(45) Date of Patent: Feb. 24, 2004

(54) FREE MOVEMENT GUIDING INSTALLATION

(76) Inventor: Theo Häring, Alpenblickstasse 23, Dettighofen (DE), D-79802

( * ) Notice: Subject to any disclaimer, the term of this patent is extended or adjusted under 35 U.S.C. 154(b) by 0 days.

(21) Appl. No.: 10/150,460

(22) Filed: May 17, 2002

(65) Prior Publication Data
US 2003/0213439 A1 Nov. 20, 2003

(51) Int. Cl.[7] ............................................. A01K 15/02
(52) U.S. Cl. ....................................................... 119/704
(58) Field of Search ................................. 119/704, 702, 119/712, 908

(56) References Cited

U.S. PATENT DOCUMENTS 5,630,380 A * 5/1997 Karanges ................... 119/704
6,213,056 B1 * 4/2001 Bergmann et al. .......... 119/704

FOREIGN PATENT DOCUMENTS

| DE | 2852777 | 6/1979 | .......... A01K/15/02 |
| DE | 39 35 142 C 1 | * 4/1991 | .......... A01K/15/02 |
| DE | 19746562 | 6/1999 | .......... A01K/15/00 |

* cited by examiner

Primary Examiner—Charles T. Jordan
Assistant Examiner—Bret Hayes
(74) Attorney, Agent, or Firm—Janet Sleath; Ann W. Speckman

(57) ABSTRACT

A free movement guiding installation is provided, which comprises a number of guide gratings suspended on a motor-drivable profile ring. The guide gratings revolve in the region of a circular longeing path and are each distanced to one another. The intermediate space between two neighboring guide gratings forms a horse guiding region. The profile ring is movably held on supports over the circular longeing path by way of a suspension which comprises a frame element with support wheels for the profile ring.

11 Claims, 3 Drawing Sheets

FREE MOVEMENT GUIDING INSTALLATION

TECHNICAL FIELD OF THE INVENTION

The present invention relates to a free movement guiding installation for training horses on a circular longeing path.

BACKGROUND OF THE INVENTION

Free movement guiding installations for training horses which can be assembled on an open field or in an arena are known in the art. Such installations include a circular longeing path which is also called a hoof track. Instead of being led by persons holding a line, horses are guided through a device on this longeing path. This device, similar to a carrousel, consists of a hub-spoke construction comprising support arms projecting radially outwards from a rotational center. A guide grating hangs downwards on each support arm at its radial outer region. Each guide grating is provided with rubber flaps which are fastened to its lower edge and hang freely downwards.

The hub-spoke construction consists of a stable support design made of metal which is rotatably and centrally mounted on a column. The column may be fastened in a standing manner, on or in the ground, or in an arena, in particular a circular arena, centrally suspended on the roof construction. The hub-spoke construction comprises a central drive ring concentric to the rotatable mounting. This drive ring is driven by an electric motor by way of friction coupling, via a friction wheel. The electric motors are controllable in their speed and rotational direction. With this, the complete hub-spoke construction can be driven, accelerated, braked and also changed in rotational direction. The horses in a horse guiding region must run around between, in each case, two neighboring guide gratings on the longeing path according to a predetermined speed. The guide gratings may be electrically charged so that the horses do not attempt to reduce the speed of the whole installation by utilizing their bodies to brake. These installations have a great weight so that the hub-spoke design is sufficiently stable. This hub-spoke design is basically the same as the design of a carrousel or an enormously over-dimensioned umbrella. Therefore, one may not subsequently attach any additional guide gratings in order to provide a larger number of horse guiding regions.

Since the drive is controlled by the inner concentric ring, the circumferential speed of the drive is very slow. Due to the very large lever arms of the support arms at the outer circumference, the circumferential speed is much greater in the region of the guide gratings and the longeing path. As a result, this demands a very exact control, a greatly dimensioned electric motor, and a suitable loading of the friction coupling. The complete rotatable mounting must likewise stand up to the heavy weight and the large torques which in turn make the whole design more complex and heavy. Due to this, there are moments of inertia, in particular during acceleration and deceleration, which likewise adds load to the whole design. Such a free movement guiding installation is taught in German patent DE 28 52 777 A1.

German patent DE 19746562 shows another design of a free movement guiding installation for training horses with a circular longeing path. This design is limited on the inside and outside with, in each case, a fence or a wall, and is covered over supports for supporting a roof. In the region of the longeing path a support design hanging down is arranged on the support. At the lower end of the support design, one support wheel is attached on both sides. The support wheels are arranged at an angle to one another and engage obliquely downwards onto a revolving profile ring. The support wheels, due to their arrangement, may assume a guiding function as well as a support function for the revolving profile ring. A drive motor acts on and drives the profile ring via a drive wheel Guide gratings are suspendingly attached at equal distances to one another on the profile ring. This system has severe dynamic problems due to the size and mass of the profile ring. These problems lead to the production of noise, shakings and the rough running of the free movement guiding installation.

SUMMARY OF THE INVENTION

The present invention provides a free movement guiding installation for training horses on a circular longeing path, which does not have the disadvantages discussed above. The inventive device reduces, or alleviates, the occurring dynamic problems. Noise conditions, shakings and rough running are improved.

The inventive free movement guiding installation comprises a number of guide gratings which are suspended on a motor-drivable profile ring, revolve in the region of the circular longeing path and are each distanced to one another, wherein the intermediate space between two neighboring guide gratings forms a horse guiding region, and wherein the profile ring is movably held on supports over the circular longeing path by way of a suspension which comprises a frame element with support wheels for the profile ring.

BRIEF DESCRIPTION OF THE DRAWINGS

The free movement guiding installation according to the invention is hereinafter described in combination with the drawings.

DETAILED DESCRIPTION

The inventive free movement horse guiding installation has a light profile ring located on a star-shaped rotatable carrousel, which is designed as a motor-drivable horse guidance system. The light profile ring which revolves only in the region of the longeing path, and which forms a complete circle, and carries the guide gratings around. The profile ring is carried and guided by support and guide rollers, and driven only for revolving motion. Thus the drive for the revolving motion of the guide gratings may likewise be arranged in the region of the longeing path, which considerably improves the speed control, the forward, backward, and reverse motion of the revolving speed, since no great lever arms are present between the drive and the driven guide gratings. Horses to be trained may no longer bring the installation to a stop easily. Additionally, the whole design is decisively lighter which in turn affects the design of the roof of an indoor arena. A decisive advantage also lies in the fact that one may assemble or remove additional guide gratings to change the number of horse guiding regions at any time. To do this, one does not need to make any changes to the construction. Instead of utilizing a very simple and sufficient wheel drive, other known drives may also be employed.

Figure 1:
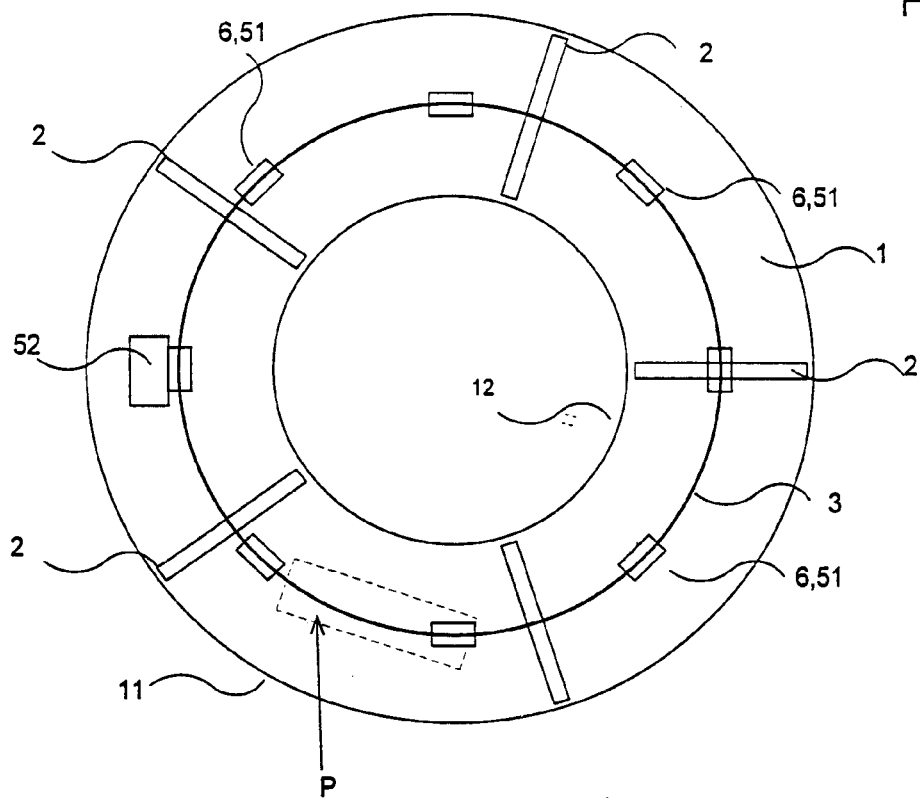
FIG. 1 is a top view of the schematic arrangement of the invention.
Figure 3:
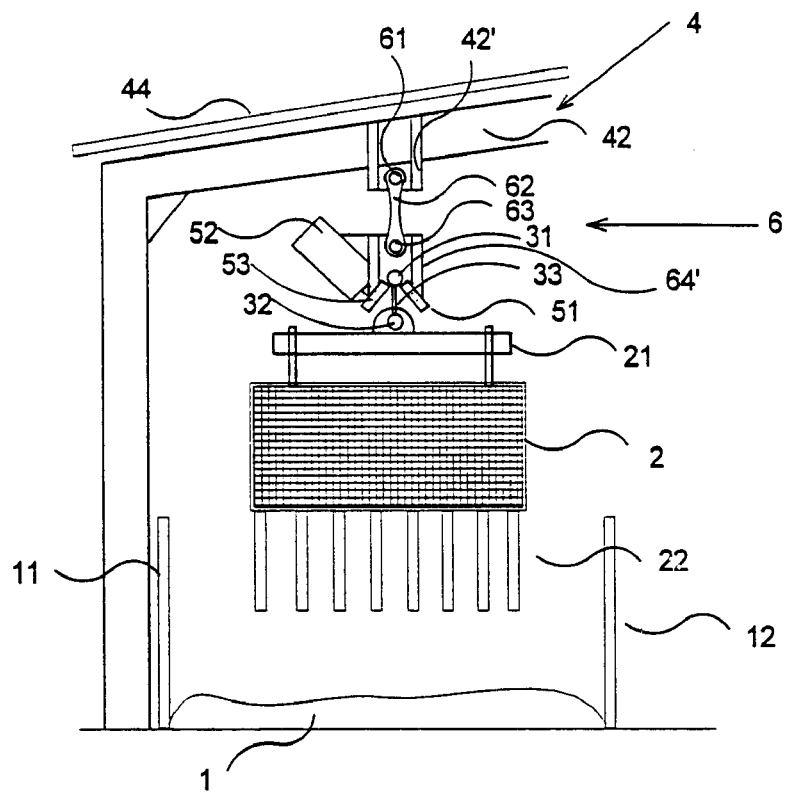
FIG. 3 is a cross sectional view of an other embodiment of the invention, showing the suspension, guiding, drive and guide grating.

In FIG. 1, the top view of a revolving profile ring 3 with several guide gratings 2 is shown. The revolving profile ring 3 forms a complete circle which is located within the region of the circular longeing path 1. In this embodiment, the complete circle of the revolving profile ring 3 is selected such that it is located roughly in the middle of the longeing path 1. In this manner, the suspension of the guide gratings 2 may be carried out in the simplest and most economical manner. As shown in FIG. 3, suspension 6 is approximately uniformly distributed over the circumference of the circle of the profile ring 3. This guarantees that the profile ring 3 may rotate in a manner that is uniformly guided and carried on the support wheels 51. A number of guide gratings 2 hang downwards on the profile ring 3 and are distributed at regular distances over the circumference. A horse guiding region for a horse P is located between each two neighboring guide gratings 2. A drive wheel 53 for driving the profile ring 3 is located on one of the suspensions 6, the drive wheel being actively connected to a drive motor 52.

Figure 2:
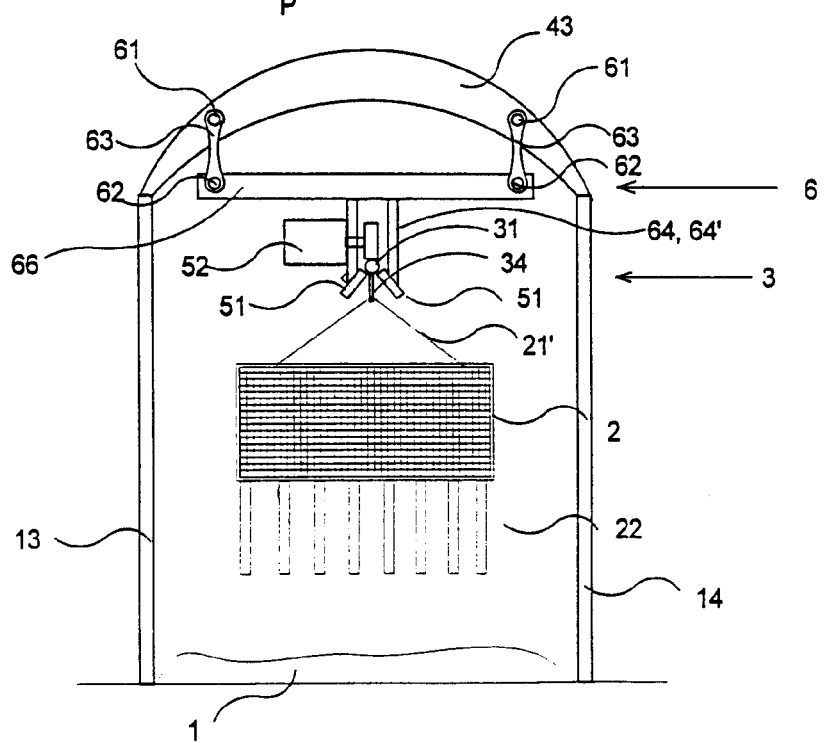
FIG. 2 is a cross sectional view of an embodiment of the invention, showing the suspension, guiding, drive and guide gratings.

FIGS. 2 to 5 show cross sectional views of different embodiments of the suspension, guiding, drive and guide gratings. A circular longeing path 1 is provided on the inside and outside with a fence 11, 12 or a wall. Longeing path 1 is covered over with a design 4 having supports 42 for supporting a roof 44. In the region of the longeing path 1, from supports 42, suspension 6 hangs in a downward direction. A support wheel 51 is mounted on both sides at the lower end of the suspension 6. The support wheels 51 are at an angle to one another and from obliquely below engage profile ring 3. Thus, due to their arrangement, the support wheels 51 may assume a guiding function as well as a support function for the revolving profile ring 3. One of the support wheels 51 shown in FIG. 3, is directly and drivingly connected to a drive motor 52 fastened on the suspension 6, also serves as a drive wheel 53 of a friction wheel drive. In order to ensure a secure frictional engagement between the drive wheel 53 and the revolving profile ring 3, and simultaneously to prevent any shaking, a loosely running counter pressure roller may be positioned opposite the drive wheel 53. Another embodiment of the invention is shown in FIG. 2, where a drive wheel 53 rests above support wheels 51 on the profile ring 3. This embodiment has the advantage that the profile ring 3 may be pressed against the support wheels 51 with this drive wheel 53. The drive wheel 53 may be backed up in a resilient manner, in order to increase the friction of the frictional engagement. The support wheels 51 thus act as counter-pressing rollers. A further advantage of this embodiment lies in the fact that the diameter of the drive wheel 53 of the drive may be additionally optimized with regards to the rotational speed range of the motor. The support wheels 51 may be made of metal, plastic and/or hard rubber. Similar to ski lifts, an oscillation-damping inlay or spacer may be used to dampen the noise of support wheels 51 made of metal. In the embodiment shown in FIG. 3, the revolving profile ring 3 consists of an upper round rod 31 and a lower round rod 32 which are rigidly connected to one another by way of uniformly arranged webs 33. The profile ring 3 may be a T-profile or double T-profile. According to FIG. 2, the profile ring 3 consists of a single round rod 31, on which tabs 34 are attached. The tabs 34 hang in a downward manner, allowing the fastening of the guide gratings 2. This embodiment requires separate support wheels 51 for the support function and the guiding function. However, this is not the case when the profile ring 3 has inclined flanks. In the embodiment of FIG. 3, a guide grating 2 is hangingly fastened on a lower round rod 32. This fastening may be carried out, for example, by way of chains 21' (FIG. 2) or a support rod 21 (FIG. 3). Rubber flaps 22 are located on, and hang downwards from the guide gratings 2. The guide gratings 2 may be attached rigidly or hanging freely on the profile ring 3. An electrically insulated fastening is preferred since the complete guide grating 2 may then be simply electrically charged with a cattle guard.

In the case of a free-standing installation without a roofing, the support design 4 is correspondingly lighter since no roof needs to be supported. An angular or bent support 43 fastened to at least one support 13, 14 installed within or outside the longeing path or on the ground is sufficient. With this design, the suspensions 6 are arranged on the bent support 43. Such an embodiment is shown in FIG. 2.

Figure 4:
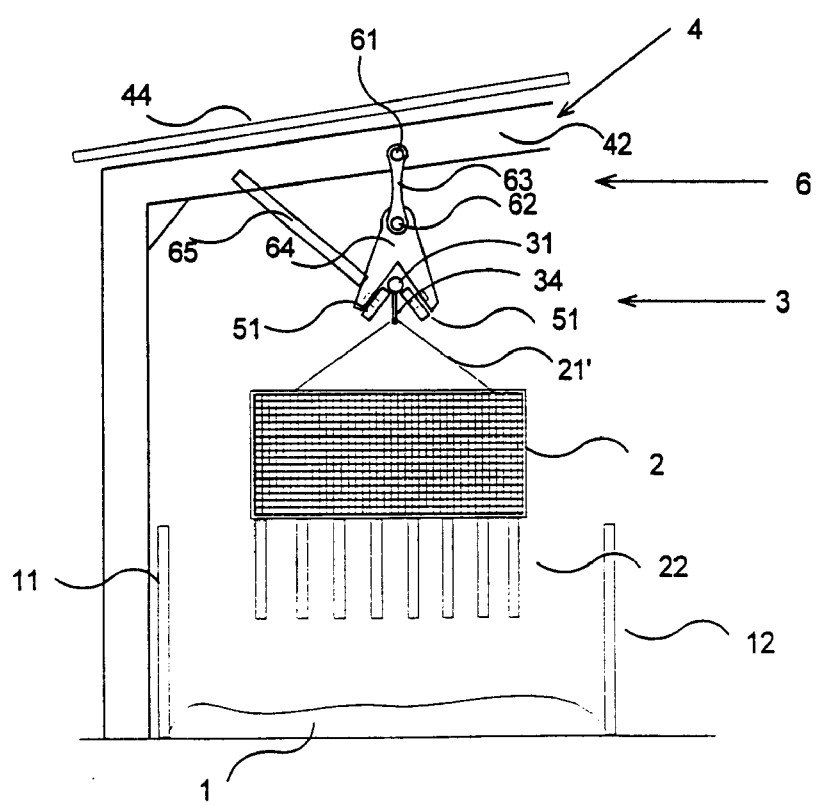
FIG. 4 is a cross sectional view of yet another embodiment of the invention, showing the suspension, guiding, drive and guide grating.

The suspensions 6 have the object of swingingly suspending the support wheels 51 and the drive motor 52 connected to the drive wheel 53 so that irregularities in the profile ring 3 are compensated while the system is running. In the embodiment of FIG. 4, the running wheels 51 are arranged in a frame element 64. The frame element 64 extends towards the top of the system. A first linkage 62 is located at a distance from the running wheels 51 towards the top. At linkage 62, the frame element 64 is pivotably attached to a support lever 63. Running wheels 51 and the frame element 64 are connected to a support 42 by way of the support lever 63. This connection is preferably pivotable with a second linkage 61. The first and second linkages 62, 61 may be formed of a bolt which is mounted in a through-bore. Depending on the load, an application of ball bearings or slide bearings may be used in order to keep wear to a minimum. A shock absorber 65 may be installed between the frame elements 64, 64' (FIG. 4) and the support 42. This prevents excess lateral movements of the profile ring 3 and improves the oscillation effect by damping the movement of the frame elements 64, 64'.

It is evident that this suspension 6 combining the drive motor 52 together with the drive wheel 53 needs a strong design. To achieve such design, the frame element 64 for accommodating the drive as a frame element 64' is suitably configured and designed more strongly. Likewise, the fastening on support 42 may be supplemented with a suitable support reinforcement 42' as shown in FIG. 3.

With a free movement guiding installation according to FIG. 2, the suspension 6 is advantageously designed with two equal support levers 63. These support levers 63 are located at a distance to one another and are connected to one another by way of a connection lever 66 via a first linkage 62. The frame elements 64, 64' are fastened to the connection lever 66. The advantage of this embodiment lies in the fact that the supports may have a lighter dimension since the forces are arranged closer to supports 13, 14. A shock absorber may be used to improve the shaking.

Figure 5:
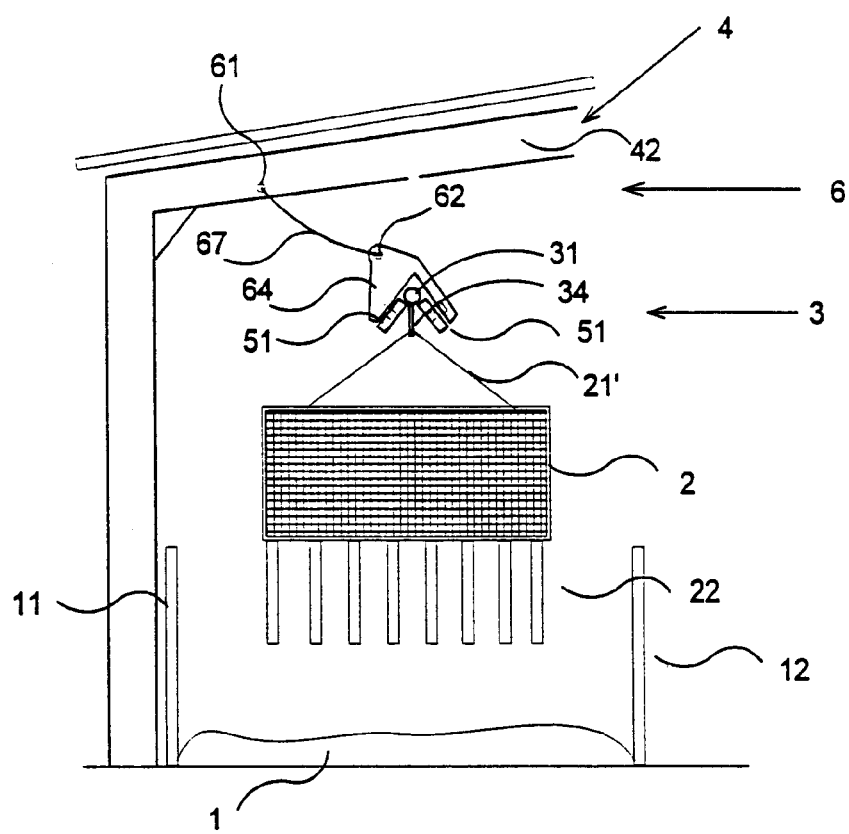
FIG. 5 is a cross sectional view of still another embodiment of the invention, showing the suspension, guiding, drive and guide grating.

In FIG. 5, a further embodiment of the suspension 6 is shown. In contrast to the previously described embodiment, the function of the support lever is assumed by a pull cable 67. The pull cable 67 is fastened to the support 42 and to the frame element 64 at linkages 61 and 62. The pull cable 67 may be made of steel cable, chain or other suitable materials. The frame element 64 connected to the support wheels 51 is suspended diagonally and outwardly in an upwards manner with a diagonal bracing. Since the supports 42 are positioned at regular distances about the circumference of the free movement guiding installation, the frame elements 64 and the support wheels 51 are also distributed regularly. In this manner, the profile ring 3, by way of the support wheels 51 and the frame elements 64, are pulled outwardly and upwardly via the diagonal bracing. The profile ring is further held concentrically at a uniform height over the longeing path 1. Irregularities of the profile ring 3 and in the course of the profile ring 3 are thus automatically compensated in a system-immanent manner. The suspension system 6 likewise independently dampens the movements of the system. The frame element 64 for this type of suspension 6 is likewise designed such that the support wheels 51 are located and balanced in the correct position in order to be able to correctly support and guide the profile ring 3. This may be achieved by the first linkage 62 being arranged in an off-centered position on the frame element 64.

Further improvements, particularly in the area of clattering, may be achieved by inlaying a layer of rubber or other elastic material onto the surface of the support wheels 51. Alternatively, rims floating on springs may serve as running surfaces on the support wheels 51.

What is claimed is:

1. A free movement guiding installation for training horses on a circular longeing path, comprising:
   (a) a motor-drivable profile ring movably and pivotably held on supports over the circular longeing path by a suspension, the suspension comprising a frame element with support wheels for the profile ring; and
   (b) a number of guide gratings suspended on a motor-drivable profile ring which revolve in the region of the circular longeing path and are distanced to one another to form a horse guiding region between two neighboring guide gratings.

2. A free movement guiding installation according to claim 1, wherein the frame element comprises a motor and a drive wheel.

3. A free movement guiding installation according to claim 2, wherein the profile ring comprises a round rod which is arranged below the profile ring and on which the guide gratings are fastened.

4. A free movement guiding installation according to claim 1, wherein the suspension comprises a support lever which is pivotably arranged at a first linkage on the frame element and at a second linkage on the support.

5. A free movement guiding installation according to claim 1, wherein the suspension comprises two support levers which with first linkages are pivotably arranged on a connection lever and with second linkages are pivotably arranged on the support, wherein the frame element is fastened to the connection lever.

6. A free movement guiding installation according to claim 4, wherein a shock absorber is present between the frame element and the support lever.

7. A free movement guiding installation according to claim 1, wherein the suspension comprises a pull cable by way of which the frame element is tensioned to the support.

8. A free movement guiding installation according to claim 7, comprising multiple suspensions arranged regularly distributed on the circumference of the longeing path, and wherein the pull cable forms a diagonal bracing for supporting and guiding the profile ring.

9. A free movement guiding installation according to claim 1, wherein the support wheels are provided with a layer of elastic material.

10. A free movement guiding installation according to claim 1, wherein the support wheels have rims floating on spring elements.

11. A free movement guiding installation according to claim 2, wherein a loosely running counter-pressure roller is arranged lying opposite the drive wheel and pressing the profile ring against the drive wheel.

\* \* \* \* \*